Feb. 4, 1930.  A. T. BROWN  1,745,832
AGRICULTURAL MACHINE
Filed Dec. 16, 1921   2 Sheets-Sheet 1
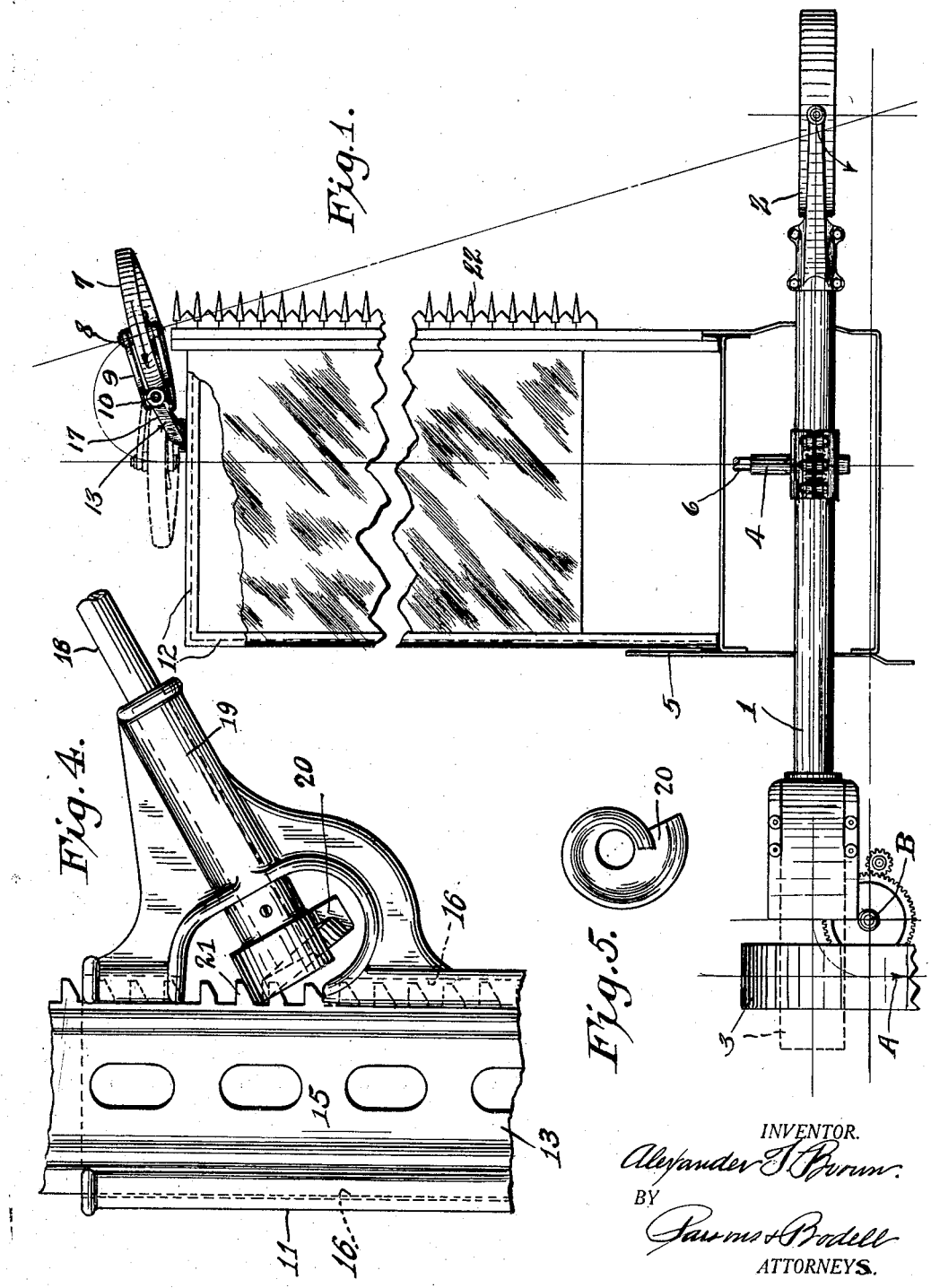
INVENTOR.
Alexander T. Brown.
BY
Parms & Bodell
ATTORNEYS.

Feb. 4, 1930. A. T. BROWN 1,745,832
AGRICULTURAL MACHINE
Filed Dec. 16, 1921 2 Sheets-Sheet 2
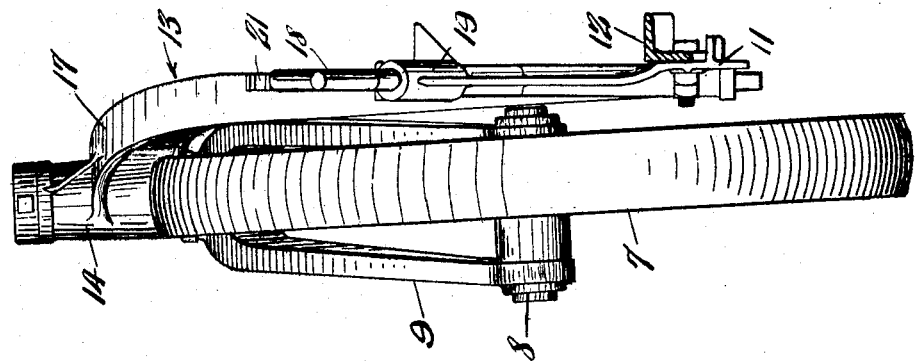
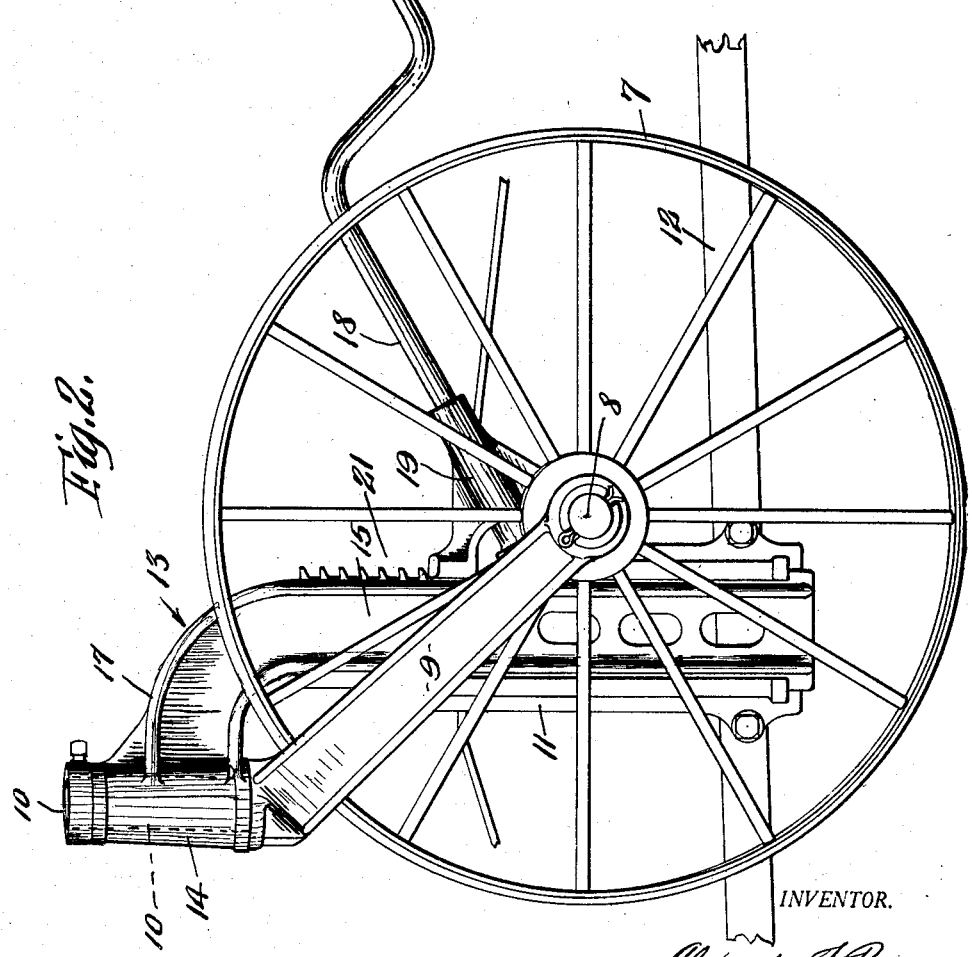
INVENTOR.
BY Alexander T. Brown
Parsons & Bodell
ATTORNEYS.

Patented Feb. 4, 1930

1,745,832

UNITED STATES PATENT OFFICE

ALEXANDER T. BROWN, OF SYRACUSE, NEW YORK

AGRICULTURAL MACHINE

Application filed December 16, 1921. Serial No. 522,892.

This invention relates to such agricultural machines as binders and has for its object a particularly simple and efficient arrangement of a caster wheel in place of the usual grain wheel, and also the arrangement of such caster wheel with respect to the tilting axle of the binder and to a swivelling tractor wheel at the rear end of the tractor frame supporting the binder and to a front or steering wheel at the front end of the tractor frame.

The invention consists in the novel features and in the combinations and constructions hereinafter set forth and claimed.
In describing this invention, reference is had to the accompanying drawings in which like characters designate corresponding parts in all the views.

Figure 1 is a fragmentary plan view of a motor agricultural machine embodying my invention, parts being omitted.

Figure 2 is a side elevation of the caster wheel, the contiguous part of the frame of the machine being also shown.
Figure 3 is an end elevation of parts seen in Fig. 2.

Figure 4 is an enlarged fragmentary elevation of the means for adjusting the implement frame upwardly and downwardly relatively to the axis of the caster wheel.

Figure 5 is a face view of the cam of the operating means shown in Fig. 4.

This machine comprises generally, a main frame having a transverse bearing, wheels supporting the main frame, one of which is a tractor wheel, an implement as a binder, the frame of which is mounted on the main frame, and having an axle journaled in said bearing, a castering grain wheel at the outer side of the binder normally arranged with its axis in line with said bearing, the tractor wheel being mounted to swivel about an upright axis in order to manœuvre the machine and to turn the machine at corners, the caster wheel being free to caster during the turning of the machine by the tractor wheel or by the steering wheel to be hereinafter described, and to assume its normal position with its axis in line with the main axle or the tilting axis of the binder when the machine travels forwardly in a straight line.

1 designates the main frame which is here shown as provided with the steering wheel 2 at its front end, with a turning or swiveling and tractor wheel 3 at its rear end, and with a transverse bearing 4 between its ends.

The construction of the main frame 1, the means for operating the steering wheel 2 and the motor, and connections between the motor and the turning or tractor wheel forms no part of this invention, except as the operations of the wheels coact with the caster wheel to be presently described.

Similar tractor and steering wheels are fully shown and described in my patents Nos. 1,399,739 issued December 13, 1921; 1,247,073 of November 20, 1917; 1,416,259, May 16, 1922 and 1,341,140 of April 10, 1923.

5 is the binder frame mounted in any suitable manner on the frame 1, it having an axle 6 journaled in the bearing 4. The axle shown is the usual, although not necessarily, the main axle on which ordinarily is mounted the main wheel of a horse or tractor drawn binder. The implement itself may be of any suitable form, size and construction.

The binder construction is the same as that shown in a horse drawn binder, and the application of a horse drawn binder to a motor binder is shown in patents to A. T. Brown and C. S. Brown No. 1,449,648 of March 27, 1923 and to A. T. Brown No. 1,582,967 of May 4, 1926.

7 is the caster wheel, the axle 8 of which is normally arranged in alinement with the axis of the bearing 4.

The axle 8 of the caster wheel 7 is supported by a fork 9 inclining upwardly and forwardly and having a substantially upright spindle 10 at its upper end. The fork 9 instead of being bifurcated may be of single construction, or one sided, or of any suitable construction. The axis of the spindle 10 preferably lies in a vertical plane extending parallel to the axis of the wheel 7, when the wheel is in normal position, that is, in a vertical plane extending transversely of the line of draft but is preferably inclined slightly out of a vertical plane parallel to the line of draft as shown in Fig. 3 to keep the wheel from fouling on the uncut grain, and the spindle 10 is located directly above the front portion of the tread of the wheel, that is, in front of the axis of the wheel.

The connections between the caster wheel and the frame 5 of the implement, comprise a bracket or a slide 11 arranged vertically on a bar 12 on the frame, a bracket 13 having a bearing 14 mounted on the spindle 10 and a vertically extending portion 15 located in the rear of the bracket 13 and extending vertically along the inner side of the wheel 7 near the axis of the wheel but between such axis and the axis of the spindle 10, and such vertical portion is slidably engaged by the guide or bracket 11, said vertical portion being here shown as extending into a channel 16 in the bracket 11.

This vertical portion 15 is connected to the bearing 14 by a rearwardly extending portion as a goose neck 17.

In order to keep the slide or bracket 11 from binding on the upright portion 15, the vertical portion 15 is located as close as practical to the axis of the wheel 7 and near the vertical plane passing through the tread of the wheel where it engages the ground which plane is parallel to the line of draft.

The means for raising and lowering the frame relatively to the caster wheel may be of any suitable form, size and construction, and as here shown, comprises the well known crank 18 carried in the bearing 19 on the bracket or slide 11 and having the spiral tooth 20 at its end coacting with the rack 21, on the upright portion 15 of the bracket 13. As the crank is turned in one direction, this spiral cam climbs up the teeth of the rack, and hence lifts the outer end of the binder frame.

A device not shown, but which is well known by those skilled in the art, is used in connection with the axle 6 to raise the inner end of the binder frame relatively to the main binder ground wheel and in this case relatively to the bearing 4.

In binders etc., as is well known by those skilled in the art, the binder frame is tiltable about the transverse axis of this axle 6 to tilt the knife 22 to conform to inequalities in the grain.

In the ordinary steering or guiding of the machine along a substantially straight course, the wheel 2 is used as in any one of Patents Nos. 1,399,739; 1,247,073; 1,416,259 and 1,451,140, previously referred to, and in turning a square corner, particularly when cutting grain, the tractor corner turning wheel 3 is used in substantially the same manner as that set forth in Patents Nos. 1,449,648 and 1,582,967 to guide the machine. In some instances, both wheels 2 and 3 may be used to manœuvre the machine.

In operation, turning a corner, when the tractor wheel 3 is turned about its vertical axis B through its spindle as indicated by the arrow A, Fig. 1, from its straight position indicated in dotted lines in Fig. 1 to an angular position, and then continues to rotate or roll about its axle or horizontal axis, it swings the whole machine about a vertical axis near the front steering wheel 2; or when the machine is manœuvred by the steering wheel, the caster wheel 7 is free to caster and facilitate the turning of the machine. Thus, by my caster wheel, the standard binder can be mounted upon the frame 1 by merely removing the main binder wheel and placing its axle in the bearing 4 and substituting my grain or caster wheel for the grain wheel now used in such binders.

What I claim is:

1. In an agricultural machine, the combination of a main frame having a transverse bearing, wheels supporting the main frame including a wheel movable about an upwardly extending axis into different angular positions for turning the machine, an implement frame having an axle mounted in the transverse bearing whereby the implement frame is tiltable, a wheel mounted at the outer end of the implement frame with its axis normally in line with said bearing and mounted to caster about an upright axis during turning of the machine by the steering wheel, substantially as and for the purpose described.

2. In an agricultural machine, the combination of a main frame having a transverse bearing, wheels supporting the main frame including a tractor wheel movable about an upright axis into different angular positions for turning the machine, an implement frame having an axle mounted in the transverse bearing and being tiltable about the axis of said bearing, a wheel mounted at the outer end of the implement frame with its axis normally in line with said bearing and mounted to caster about an upright axis during turning of the machine by the tractor wheel when in angular position, substantially as and for the purpose described.

3. In an agricultural machine, the combination of a main frame, a steering wheel at the front end of the frame, a tractor wheel at the rear end of the frame and mounted to turn about an upright axis into different angular positions, a transverse bearing between the ends of the frame, a tilting implement frame having an axle mounted in said bearing and a caster wheel at the outer end of the implement frame and normally arranged with its axis in line with the axis of said bearing, substantially as and for the purpose specified.

4. In an agricultural machine, the combination of a frame, means for supporting the frame comprising a castor wheel, a fork supporting the castor wheel, a bracket adjustably connected to the frame and having an upright bearing for the fork arranged with its axis in front of the wheel, means for raising and lowering the frame along the bracket relatively to the wheel, said bracket including a vertical portion arranged near the axis of the wheel and arranged to apply a lifting force to the frame in a vertical line near the axis of the castor wheel.

5. In an agricultural machine, the combination of a frame, means supporting the frame comprising a caster wheel, an upwardly inclined fork therefor having an upright spindle at its upper end located over the tread of the wheel in front of the axis of the wheel, a bracket having a bearing on the spindle, the bracket having a vertical portion located in the rear of the bearing, and at one side of the wheel, and means connecting said portion to the frame and for adjusting the frame vertically relatively thereto, substantially as and for the purpose specified.

6. In an agricultural machine, the combination of a frame, means supporting the frame comprising a caster wheel, an upwardly inclined fork therefor having an upright spindle at its upper end and over the trend of the wheel in front of the axis of the wheel, a bracket having a bearing on the spindle and an upright portion in the rear of the bearing, the upright portion extending along the inner side of the wheel, near the axis of the wheel, and means connecting the bracket to the frame for adjusting the frame vertically relatively thereto, substantially as and for the purpose described.

7. In an agricultural machine, the combination of a frame, means supporting the frame comprising a caster wheel, an upwardly inclined fork therefor having an upright spindle at its upper end and in front of the axis of the castor wheel over the tread of the wheel in front of the axis of the wheel, a bracket having a bearing on the spindle and a substantially vertically extending portion in the rear of the bearing, a slide fixed to the frame, the vertical portion of the bracket extending into the slide, and means for moving the slide and the frame along the bracket, substantially as and for the purpose set forth.

8. In an agricultural machine, the combination of a frame, means supporting the frame including a castor wheel, an upwardly inclined fork therefor having an upwardly extending spindle inclined out of a vertical plane whereby the wheel is staggered, the spindle being arranged above the tread of the wheel and in front of the axis of the wheel, a bracket having a bearing mounted on the spindle of the fork and a portion extending downwardly near the axis of the wheel when the wheel is in normal position, and near the vertical plane of the portion of the tread of the wheel engaged with the ground, and means for connecting the bracket to the frame and for adjusting the frame vertically relatively to the bracket, substantially as and for the purpose specified.

In testimony whereof, I have hereunto signed my name, at Syracuse, in the county of Onondaga and State of New York, this 7th day of December, 1921.

ALEXANDER T. BROWN.